April 17, 1962    F. J. SIGNORELLI ETAL    3,029,480
SEAL STRUCTURE
Filed July 22, 1959
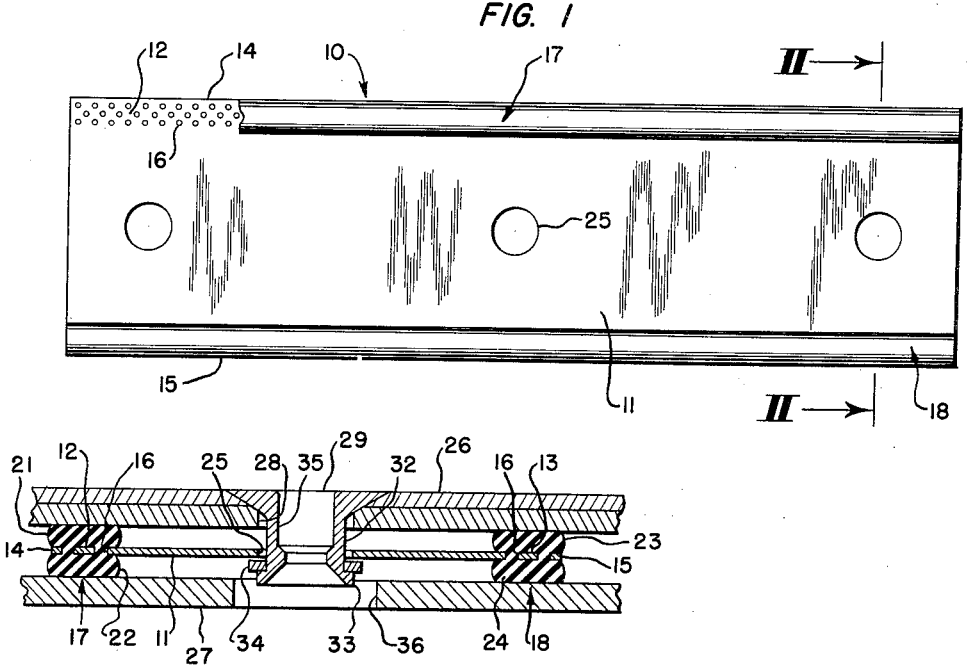
FIG. 1
FIG. 2
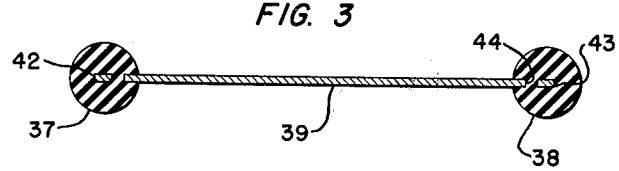
FIG. 3
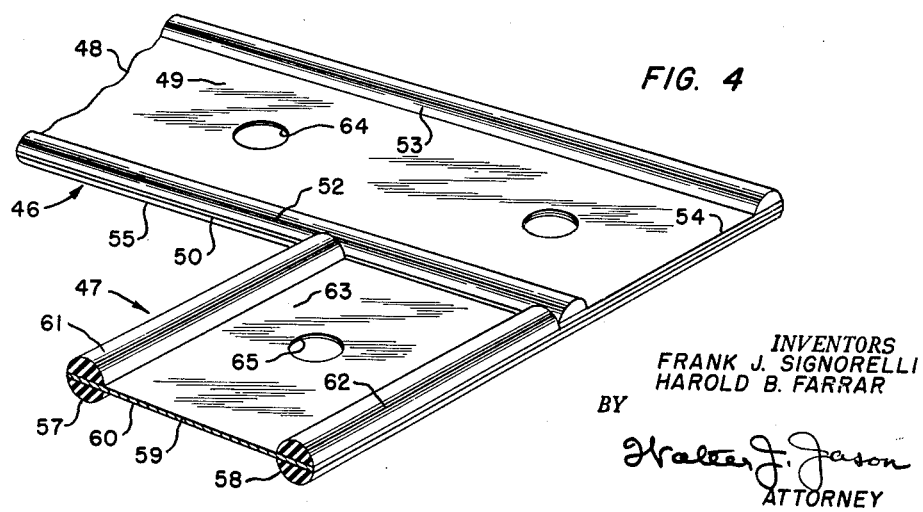
FIG. 4
INVENTORS
FRANK J. SIGNORELLI
HAROLD B. FARRAR
BY
*Walter J. Jason*
ATTORNEY

3,029,480
SEAL STRUCTURE

Frank J. Signorelli, El Cajon, and Harold B. Farrar, San Diego, Calif., assignors to General Dynamics Corporation, San Diego, Calif., a corporation of Delaware
Filed July 22, 1959, Ser. No. 828,842
6 Claims. (Cl. 20—69)

The present invention generally relates to a seal structure, and more specifically relates to a strip seal arrangement particularly suited for use between relatively flat, parallel surfaces such as aircraft access doors and fuselages.

While there are, at present, numerous seal arrangements which could be used to provide sealing between aircraft access doors and fuselages and in other similar areas, the seal structure embodied in the present invention is superior to these arrangements in many respects. In many present seal arrangements a resilient seal element is bonded to one of the members to be sealed. The seal element is sometimes even bonded in a groove or channel. Such seal attachment procedures are slow and costly. Then too, after such seal arrangements have seen sufficient service to warrant their replacement, the removal and replacement process generally proves to be time consuming and costly.

In contrast, the present invention provides a seal structure which can be easily and quickly attached, lending itself particularly to production techniques. Further, the seal structure can be easily and rapidly replaced, in all kinds of weather, with no chemical bond cure with which to be concerned. And finally, the present invention incorporates dual resilient seal elements to doubly insure the achievement of an efficient "seal."

Therefore, an object of the present invention is to provide a seal structure adapted for quick and easy attachment.

Another object is to provide a seal structure which can be quickly and easily replaced.

Another object is to provide a seal structure having dual resilient seal elements for assuring an efficient "seal."

And still other objects and features of the present invention will be readily apparent to those skilled in the are from the following specification and appended drawing wherein is illustrated a preferred form of the invention, and in which:

FIGURE 1 is a plan view of the seal structure with a portion of one resilient seal element broken away;

FIGURE 2 is a cross sectional view of the seal structure taken along line II—II of FIGURE 1, with the seal structure shown in use between an aircraft fuselage and access door;

FIGURE 3 is a cross sectional view showing an alternate seal structure configuration to that shown in FIGURE 2; and FIGURE 4 is a perspective view of a seal corner arrangement achieved by use of the present invention.

Referring now to FIGURES 1 and 2, a seal structure 10 is shown therein having a sheet member 11 formed in a longitudinal strip. Sheet member 11 has a pair of opposite and parallel edge portions 12 and 13, which edge portions include lateral edges 14 and 15 respectively. A plurality of holes or perforations 16 are located in each edge portion 12 and 13 and provide a plurality of passages between the upper and lower surfaces of sheet member 11. The perforations 16 are arranged in strips disposed along and adjacent lateral edges 14 and 15.

Resilient seal elements 17 and 18 are secured to edge portions 12 and 13 respectively. Seal element 17 has upper and lower portions 21 and 22, each having a substantially half-circle cross-section. The two portions 21 and 22 are molded to sheet member 11 and are formed into one integral seal element by interconnections formed through the plurality of perforations 16. Similarly, seal element 18 includes upper and lower portions 23 and 24 formed into one integral resilient seal element through perforations 16. It is to be noted that the configuration shown in FIGURES 1 and 2 is such that seal elements 17 and 18 do not cover the lateral edges 14 and 15 of sheet member 11.

In order to facilitate ease and speed of attachment, the sheet member 11 has a number of holes 25 disposed therethrough and positioned at even intervals along the centerline thereof.

FIGURE 2 shows one method for utilizing these holes to secure the seal structure to an aircraft access door 26 where it provides sealing between the access door and aircraft fuselage 27. The access door has a plurality of holes 28 around its periphery which are spaced the same distance apart as holes 25 of the seal structure. A plurality of grommets 29 are disposed through the holes 28 and have end portions 32 which protrude from the inner side of the access door toward the aircraft fuselage 27. Each grommet end portion has a circular flange 33 at the end extremity thereof. The holes 25 of seal structure 10 are of such a size as to permit the grommet flanges 33 to pass therethrough as the seal structure is placed adjacent access door 26. Then, snap rings 34 are snapped in place around the grommet end portions between flanges 33 and the seal structure 10. The snap rings are held on the grommets by flanges 33, and the seal structure is held in place adjacent the access door by the snap rings which have an outside diameter greater than the diameter of holes 25 of the seal structure.

Each of the grommets 29 has a central opening 35 therethrough to permit a fastener to be positioned therein and protrude therefrom toward aircraft fuselage 27. Fuselage 27, as shown in FIGURE 2, contains a plurality of openings 36 which are spaced the same distance apart as holes 25 of the seal structure. Thus any suitable fastener can be used to hold the access door to the fuselage, and seal structure 10 will provide an efficient seal. The grommet shown in FIGURE 2 is particularly adapted for use with the Camloc fastener sold by the Camloc Fastener Corporation of New Jersey. It is understood, however, that grommets 29 can have configurations other than that shown in FIGURE 2. Further, it is not even necessary to use the grommet method shown, for ordinary bolts or other means could be used to secure the seal structure to the access door.

Attention is directed to the fact that when the grommet configuration is used, the seal structure provides inner and outer resilient seal elements 17 and 18 to close off the fastener hole areas in the fuselage 27. At the same time, when both resilient seal elements extend around the periphery of the aircraft access opening they provide a double seal therefor.

While there are alternate ways in which the seal structure can be easily and rapidly secured in place, there are also a few alternatives in the configuration of the seal structure itself. FIGURE 3 shows resilient seal elements 37 and 38 molded to a sheet member 39 in such a manner that the lateral edges 42 and 43 of the sheet member are enclosed by the seal elements. The resilient seal elements curl about the lateral edges of the sheet member and protrude through perforations 44 in the edge portions thereof to form integral seal elements securely fastened thereto.

Another arrangement that could be used to secure the resilient seal elements to the sheet member is to use roughened strips of sheet member surface adjacent the lateral edges instead of strips of perforations. The roughened surface strips could be used with both resilient seal arrangemets disclosed above.

As discussed, one use to which the seal structure of the instant invention can be put is to provide a seal around aircraft access doors. In such an application the seal structure used can be formed in one continuous strip if so desired, taking somewhat the shape of a picture frame about the access opening. This continuous strip approach, however, generally is more costly than an arrangement in which the seal structure is divided into a number of lengths of seal structure, with the lengths arranged to form a continuous seal about the access opening.

FIGURE 4 shows a corner configuration produced by two such separate lengths of seal structure, designated by the numerals 46 and 47. Sheet member 48 of seal structure 46 has an upper surface 49 and lower surface 50. Resilient seal elements 52 and 53 are secured to edge portions of upper surface 49 and extend to the end 54 of sheet member 48. Resilient seal elements 55, and another not shown, are secured to edge portions of lower surface 50 but do not extend to end 54 of sheet member 48; instead, they terminate short of end 54 at a distance therefrom equal to the width of seal structure 47. Seal structure 47 is similarly constructed, save that the resilient seal elements 57 and 58 which extend to the end of sheet member 59 are on the "lower" surface 60 and the resilient seal elements 61 and 62 which terminate short of the end of sheet member 59 are on the "upper" surface 63 thereof. Actually, the two seal structures 46 and 47 have the same configurations, but one is inverted with respect to the other. Thus, they easily form an overlapping corner as shown, facilitating their arrangement in a continuous seal about any opening. It is noted that the holes 64 of seal structure 46 and the holes 65 of seal structure 47 are spaced so that the holes at the actual corner formed by the two lengths of seal structure are in alignment with each other. This allows the two lengths to be securely fastened to each other at the corner, as well as securely fastened to another member, such as an aircraft access door.

From this it can be seen that while certain preferred embodiments of the invention have been specifically disclosed, it is understood that the invention is not limited thereto as many variations will be readily apparent to those skilled in the art and the invention is to be given its broadest possible interpretation within the terms of the following claims.

What we claim is:

1. A seal structure comprising a sheet member, said sheet member being perforated along opposite edge portions thereof, and resilient seal elements positioned over said perforations on and along opposite edge portions and opposite faces of said sheet member, said seal elements having a semi-circular cross-sectional configuration, and integral portions interconnecting said seal elements solely through said perforations of said sheet member.

2. A seal structure comprising a first longitudinal sheet member, a second longitudinal sheet member, said first sheet member positioned at an intersecting angle with respect to said second sheet member and having the end portion thereof overlapping the end portion of said second sheet member, said first and second sheet members each being perforated along opposite edges thereof, and resilient seal elements positioned over said perforated edges, portions interconnecting said seal elements extending through said perforations of said sheet members, each of said seal elements being semi-circular in cross-sectional configuration, two of said seal elements on opposite edges of one face of said first sheet member terminating against a seal element of said second overlapping sheet member and two of said seal elements on opposite edges of an opposite face of said second sheet member terminating against a seal element of said first sheet member.

3. A seal structure comprising a pair of elongated sheet members, the end portions of said sheet members being positioned one above the other to effect an overlap, and resilient seal elements secured to each of said sheet members along opposite edge portions and on opposite surfaces thereof, the seal elements disposed on one surface of one of said sheet members terminating adjacent an intersecting seal element on the other of said sheet members.

4. A seal structure comprising elongated sheet members, the end portions of adjacent sheet members being positioned one above the other to effect an overlap, said sheet members being positioned at an intersecting angle with respect to one another, each of said sheet members having their opposite edge portions perforated, and resilient seal elements positioned on opposite surfaces over said perforated edges, portions interconnecting said seal elements extending through said perforations, the seal elements disposed on one surface of one of said sheet members terminating adjacent an intersecting seal element on another of said sheet members.

5. A seal structure comprising elongated sheet members, the end portions of adjacent sheet members being positioned one above the other to effect an overlap, said sheet members being positioned at an intersecting angle with respect to one another, each of said sheet members having their opposite edge portions perforated, and resilient seal elements positioned on opposite surfaces over said perforated edge portions, portions interconnecting said seal elements extending through said perforations, each of said seal elements being semi-circular in cross-sectional configuration, the seal elements disposed on one surface of one of said sheet members terminating adjacent an intersecting seal element on another of said sheet members.

6. A seal structure comprising elongated sheet members, the end portions of adjacent sheet members being positioned one above the other to effect an overlap, said sheet members being positioned at a intersecting angle with respect to one another, each of said sheet members having their opposite edge portions perforated, and resilient seal elements positioned over said perforated edge portions, said seal elements being of a substantially circular cross-sectional configuration encompassing the edge of said sheet member, said seal elements having interconnecting portions extending through said perforations of said sheet members.

References Cited in the file of this patent

UNITED STATES PATENTS

| | | |
|---|---|---|
| 1,377,846 | Megley | May 10, 1921 |
| 1,939,004 | Fischer | Dec. 12, 1933 |
| 2,051,757 | Travis | Aug. 18, 1936 |
| 2,061,145 | Duffy | Nov. 17, 1936 |
| 2,182,983 | Goldberg | Dec. 12, 1939 |
| 2,265,693 | Knight | Dec. 9, 1941 |
| 2,364,234 | Morrell | Dec. 5, 1944 |
| 2,428,097 | Roslund | Sept. 30, 1947 |
| 2,435,006 | Jeffery | Jan. 27, 1948 |
| 2,751,643 | Dacey | June 26, 1956 |
| 2,793,406 | Focht | May 28, 1957 |

FOREIGN PATENTS

| | | |
|---|---|---|
| 631,890 | Great Britain | Nov. 11, 1949 |

OTHER REFERENCES

Encyclopedia Britannica, vol. 5, 11th ed. 1910, Carpentry, FIG. 10 on page 387. (Copy in Div. 33.)